US009182857B2

(12) United States Patent
Nagata et al.

(10) Patent No.: US 9,182,857 B2
(45) Date of Patent: Nov. 10, 2015

(54) INPUT DEVICE AND DISPLAY DEVICE PROVIDED WITH SAME

(75) Inventors: Yasunari Nagata, Kirishima (JP);
Takashi Minami, Kirishima (JP);
Yoshio Miyazaki, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 17 days.

(21) Appl. No.: 13/498,843

(22) PCT Filed: Dec. 25, 2010

(86) PCT No.: PCT/JP2010/073466
§ 371 (c)(1),
(2), (4) Date: Mar. 28, 2012

(87) PCT Pub. No.: WO2011/081112
PCT Pub. Date: Jul. 7, 2011

(65) Prior Publication Data
US 2012/0182250 A1 Jul. 19, 2012

(30) Foreign Application Priority Data

Dec. 28, 2009 (JP) ................................. 2009-297977

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01); *G06F 2203/04111* (2013.01)

(58) Field of Classification Search
CPC ............ G06F 2203/04103; G06F 2203/04111; G06F 3/044

USPC ...................... 345/173–184; 178/18.01–18.09
See application file for complete search history.

(56) References Cited

U.S. PATENT DOCUMENTS

| 5,844,506 A | * | 12/1998 | Binstead | .......................... 341/34 |
| 2003/0160928 A1 | * | 8/2003 | Ozawa et al. | .................. 349/129 |
| 2007/0132476 A1 | | 6/2007 | Maeng | |

(Continued)

FOREIGN PATENT DOCUMENTS

| EP | 1298803 A2 | 4/2003 |
| JP | 9511086 | 11/1997 |

(Continued)

OTHER PUBLICATIONS

Japanese Office Action with Statement of Relevance of non-English References, Japanese Patent Appln. No. 2012-230004, Mar. 25, 2014, 5 pp.

(Continued)

*Primary Examiner* — Kumar Patel
*Assistant Examiner* — Insa Sadio
(74) *Attorney, Agent, or Firm* — Volpe and Koenig, P.C.

(57) ABSTRACT

An input device is provided with a substrate having a main surface, a first detecting electrode pattern provided on or above the main surface of the substrate, and a second detecting electrode pattern provided on or above the main surface of the substrate wherein a portion of the second detecting electrode pattern intersects the first detecting electrode pattern through an insulator; wherein the insulator, in cross-section taken along the second detecting electrode pattern, comprises a curved convex surface in a region from an end portion to an apex of the insulator.

7 Claims, 8 Drawing Sheets

(56) References Cited

U.S. PATENT DOCUMENTS

2008/0074398 A1* 3/2008 Wright .................. 345/173
2008/0142249 A1   6/2008 Chamberlin et al.
2009/0002337 A1   1/2009 Chang
2009/0284144 A1* 11/2009 Fujioka et al. ............ 313/504

FOREIGN PATENT DOCUMENTS

| JP | 2001-154592 A | 6/2001 |
| JP | 2004-252676 A | 9/2004 |
| JP | 3134925       | 8/2007 |
| JP | 2008310551    | 12/2008 |
| JP | 3149113 U     | 3/2009 |
| JP | 3152062 U     | 7/2009 |
| JP | 3152611 U     | 8/2009 |
| JP | 2009-289235 A | 12/2009 |
| JP | 2010-146283 A | 7/2010 |

OTHER PUBLICATIONS

Japanese Office Action, Japanese Patent Application No. 2012-230004, with a Statement of Relevance of Non-English References, Jul. 23, 2013, 5 pp.

Extended European Search Report, 10840968.1, Mar. 5, 2015, 12 pgs.

European Office Action with Partial Search Report, European Patent Application No. 10840968.1, Dec. 2, 2014, 6 pgs.

* cited by examiner

INPUT DEVICE AND DISPLAY DEVICE PROVIDED WITH SAME

TECHNICAL FIELD

The invention relates to an input device for detecting a position at which a user executes an input operation, as an input position, and a display device provided with the same.

BACKGROUND ART

For example, a conventional input device such as a capacitive touch panel has a substrate, a first detection electrode pattern provided on or above a main surface of the substrate, and a second detection electrode pattern provided on or above the main surface of the substrate as well as intersecting the first detection electrode pattern (see Patent Literature 1, for example).

In such input device, there is provided an insulator for electrically insulating the first detection electrode pattern and the second detection electrode pattern between the first detection electrode pattern and the second detection electrode pattern. That is to say, the insulator is provided on the main surface of the substrate so as to cover a portion of the first detection electrode pattern, and a portion of the second detection electrode pattern is provided on an upper surface of the insulator. With the configuration, it becomes possible to arrange the first detection electrode pattern and the second detection electrode pattern to intersect with each other while electrically insulating the first detection electrode pattern and the second detection electrode pattern from each other.

However, in the conventional input device, when a cross section of the insulator along the second detection electrode pattern is viewed, the insulator is formed in a rectangular shape. Accordingly, when a pressure or the like are applied to the insulator during usage, the insulator is deformed and stress is applied to the second detection electrode pattern provided on the insulator. When the stress is repeatedly applied to the second detection electrode pattern, there is a possibility that the second detection electrode pattern breaks.
Patent Literature 1: Japanese Patent Application Laid-open No. 2008-310551

SUMMARY OF THE INVENTION

The present invention is made in view of the aforementioned problem, and it is an object of the present invention to provide an input device capable of suppressing a breakage of the second detection electrode pattern, and to provide a display device provided with the input device.

One aspect in the input device of the invention has a substrate having a main surface, a first detection electrode pattern provided on or above the main surface of the substrate, and a second detection electrode pattern provided on or above the main surface of the substrate and having a part intersecting the first detection electrode pattern via an insulator. Further, the insulator has a convex curved surface in a region from an end portion to an apex of the insulator on a cross section along the second detection electrode pattern.

MODE(S) FOR CARRYING OUT THE INVENTION

Embodiments of the invention will be explained below with reference to the drawings. However, for the convenience of explanation, the respective drawings referred to below illustrate only simplified main components that are necessary to explain the invention in the main components of an embodiment of the invention. Thus, an input device according to the invention and a display device provided with the same may include other components which are not illustrated in the respective drawings referred to by the description.

First Embodiment

An input device X1 according to a first embodiment of the invention is explained. The input device X1 is a capacitive touch panel.

Figure 1:
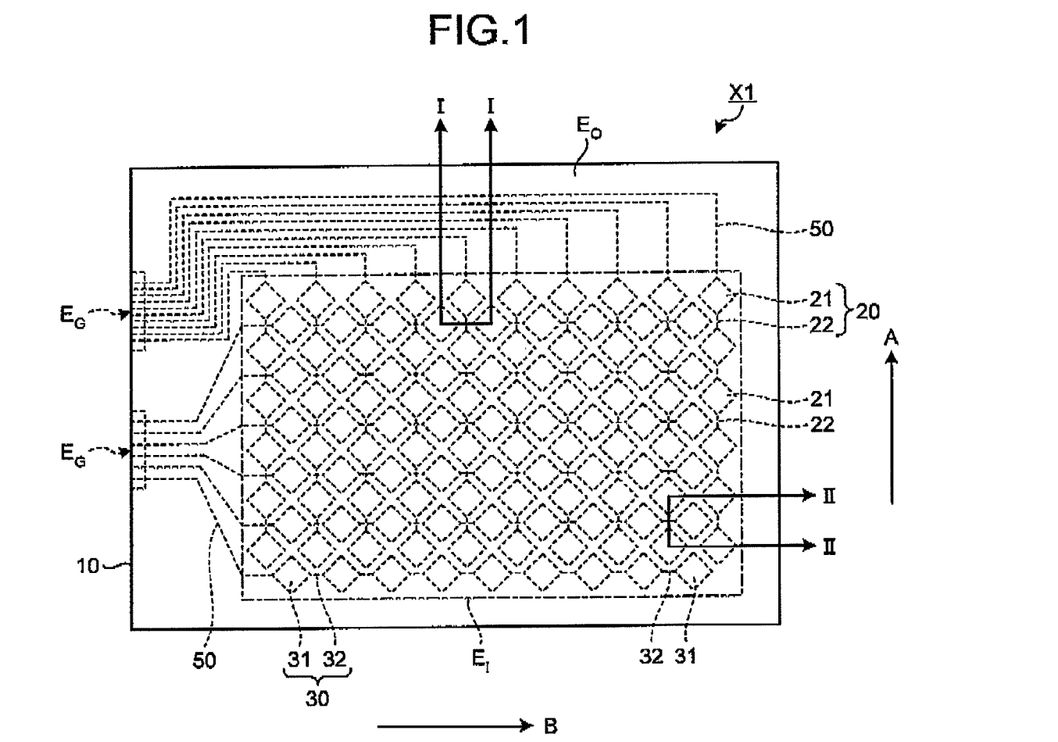
FIG. 1 is a plan view representing an input device according to a first embodiment of the invention.

As illustrated in FIG. 1, the input device X1 has: an input region $E_I$ for permitting a user to input information by operating it with a finger or the like; and an outside region $E_O$ positioned outside of the input region $E_I$. Further, the outside region $E_O$ has an outside conductive region $E_G$ that is a region electrically connected to a flexible printed circuit (FPC) not illustrated or the like.

As illustrated in FIGS. 1 to 4, the input device X1 has a substrate 10, a first detection electrode pattern 20, a second detection electrode pattern 30, an insulator 40, and a detection wiring 50.

As illustrated in FIGS. 3(a) and 3(b), the substrate 10 has a main surface 10a. The substrate 10 has, for example, a rectangular shape when viewed as a plan view, but is not limited thereto. Materials having translucency, such as for example glass or plastic are exemplified as a material of the substrate 10. Note that, in the description, "translucency" means having transparency with respect to visible light. Further, in the input region $E_I$, a surface opposite the main surface 10a of the substrate 10 is a surface for permitting a user to input information by operating it with a finger or the like.

The first detection electrode pattern 20 is provided on or above the main surface 10a of the substrate 10. The first detection electrode pattern 20 has a first detection electrode 21 and a first connection electrode 22.

The first detection electrode 21 is a member having a function of detecting a position, at which input is made by the finger or the like, in a direction of an arrow B illustrated in FIG. 1. The first detection electrode 21 is provided on a region of the main surface 10a of the substrate 10 corresponding to the input region $E_I$. The first detection electrodes 21 are disposed in a matrix state at predetermined intervals. Although the first detection electrode 21 is formed in an approximate diamond shape when viewed on a plan view, it is not limited thereto. Exemplified as a material of the first detection electrode 21 are materials having translucency and conductivity such as ITO (Indium Tin Oxide), IZO (Indium Zinc Oxide), ATO (Antimony Tin Oxide), AZO (Al-Doped Zinc Oxide), tin oxide, zinc oxide, or conductive polymer.

Exemplified as a method of forming the first detection electrodes 21 is the following method. First, a material such as ITO is coated on the main surface 10a of the substrate 10 by sputtering, vapor deposition, or chemical vapor deposition (CVD) to form a film. Then, a photosensitive resin is coated on a surface of the formed film, and the photosensitive resin is formed in a desired pattern by executing an exposure process and a development process to the photosensitive resin. Then, etching is executed to the formed film using a chemical solution or the like, to pattern the film. Then, the first detection electrode 21 is formed by removing the photosensitive resin existing on the surface of the formed film.

The first connection electrode 22 is a member having a function of electrically connecting the adjacent first detection electrodes 21. The first connection electrode 22 is provided on or above a region of the main surface 10a of the substrate 10 corresponding to the input region $E_I$. Examples of a material of the first connection electrode 22 include those of the first detection electrode 21. Further, an example of a method of forming the first connection electrode 22 includes that of the first detection electrode 21.

The second detection electrode pattern 30 is provided on or above the main surface 10a of the substrate 10. The second detection electrode pattern 30 has a second detection electrode 31 and a second connection electrode 32.

The second detection electrode 31 is a member having a function of detecting a position, at which input is made by the finger or the like, in a direction of an arrow A illustrated in FIG. 1. The second detection electrode 31 is provided on or above a region of the main surface 10a of the substrate 10 corresponding to the input region $E_I$. Further, the second detection electrodes 31 are disposed in a matrix state at predetermined intervals. Although a shape of the second detection electrodes 31 is formed in an approximate diamond shape when viewed on a plan view, the shape is not limited thereto. Examples of a material of the second detection electrode 31 include those of the first detection electrode 21. Further, an example of a method of forming the second detection electrode 31 includes that of the first detection electrode 21.

The insulator 40 is a member serving to electrically insulate the first detection electrode pattern 20 and the second detection electrode pattern 30. The insulator 40 is provided on the main surface 10a of the substrate 10 so as to cover a part of the second connection electrode 22 in the first detection electrode pattern 20. Further, the insulator 40 has an upper surface 40a facing opposite to the main surface 10a of the substrate 10 with respect to the first connection electrode 22. Further, the upper surface 40a of the insulator 40 has an apex 41 confronting the second connection electrode 22 and an end portion 42 positioned between the apex 41 and the second detection electrode 31. Materials having an insulation property such as an acrylic resin, an epoxy resin are exemplified as a material of the insulator 40.

Further, as illustrated in FIG. 3(a), the insulator 40 has a convex curved surface 43 in a region from the end portion 42 to the apex 41 of the insulator 40 on a cross section along the second detection electrode pattern 30. Note that a reason why the insulator 40 has the convex curved surface 43 will be described later.

Figure 2:
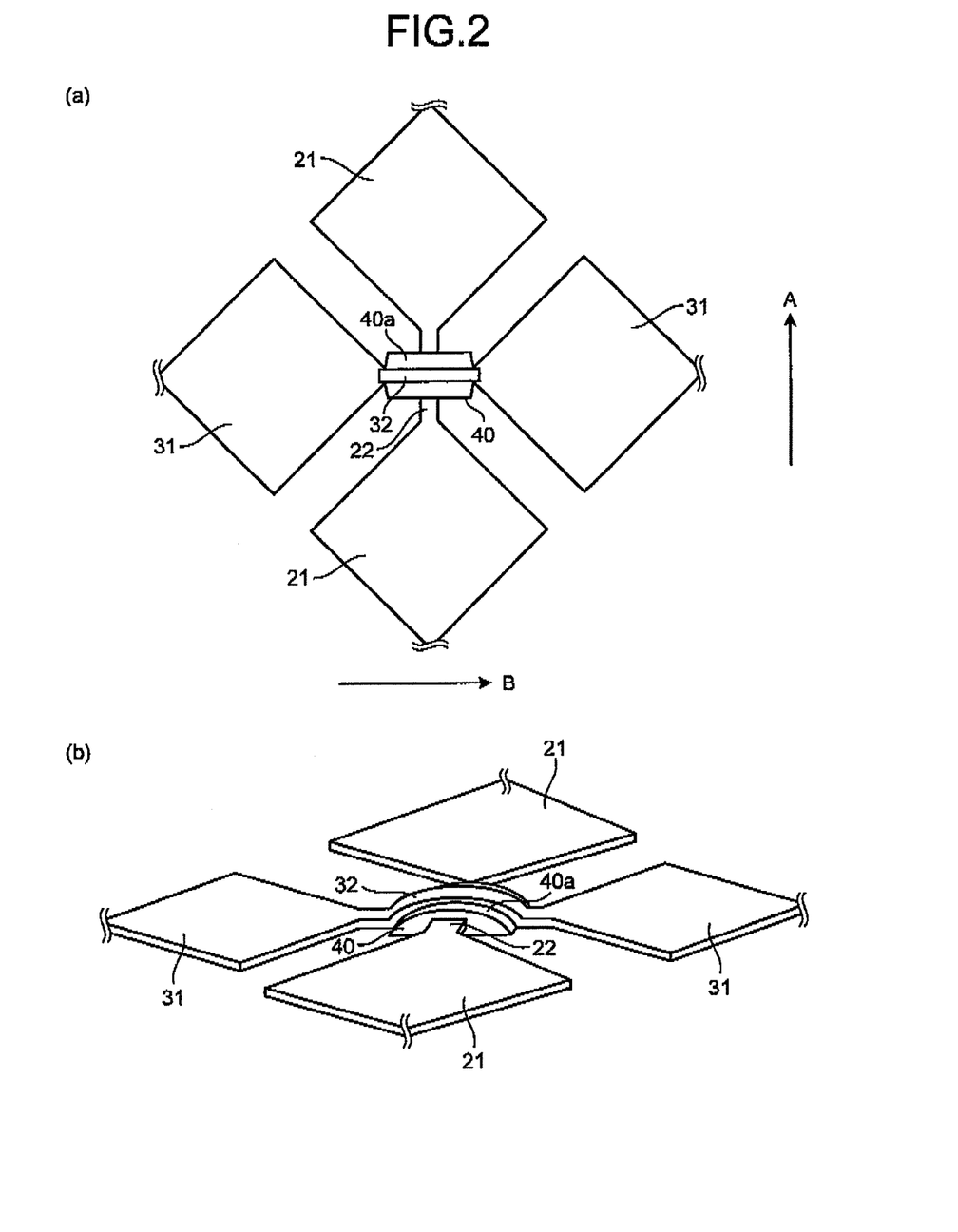
FIG. 2(a) is an enlarged plan view representing a main portion of the input device of FIG. 1.
FIG. 2(b) is an enlarged perspective view representing the main portion of the input device of FIG. 1.
Figure 3:
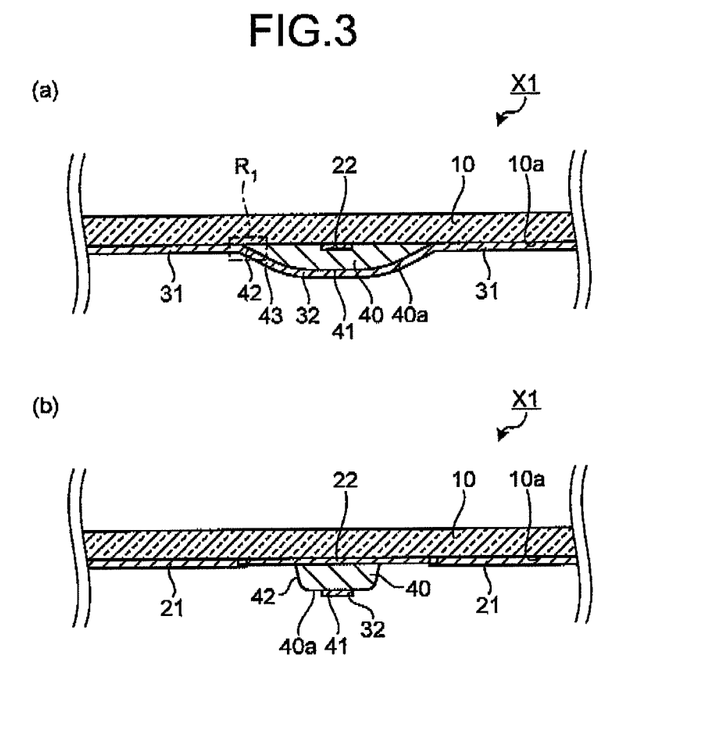
FIG. 3(a) is a cross sectional view taken along a line I-I of FIG. 1.
FIG. 3(b) is a cross sectional view taken along a line II-II of FIG. 1.

The second connection electrode 32 is a member having a function of electrically connecting the adjacent second detection electrodes 31. Further, as illustrated in FIG. 2, the second connection electrode 32 is positioned on the upper surface 40a of the insulator 40. That is, a part of the second connection electrode 32 intersects a part of the first connection electrode 22 via the insulator 40. In other words, a part of the second detection electrode pattern 30 intersects a part of the first detection electrode pattern 20 via the insulator 40. Examples of a material of the second connection electrode 32 include those of the first detection electrodes 21. Further, an example of a method of forming the second connection electrode 32 includes that of the first detection electrode 21.

As described above, the insulator 40 has the convex curved surface 43 in the region from the end portion 42 to the apex 41 of the insulator 40 on the cross section along the second detection electrode pattern 30. Accordingly, in comparison with the case that the insulator 40 is formed in the rectangular shape on the cross section along the second detection electrode pattern 30, even if a pressure force by the finger or the like of the user is applied to the insulator 40, stress applied to the second connection electrode 32 at the end portion 42 of the insulator 40 can be eased. That is, this is because since the insulator 40 has a round shape in the region from the end portion 42 to the apex 41 of the insulator 40, the stress is eased in a portion having the round shape.

Figure 4:
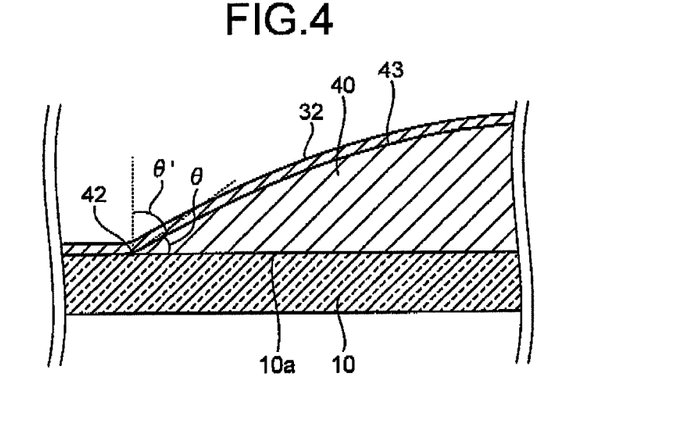
FIG. 4 is an enlarged view representing an $R_1$ section of FIG. 3(a).

FIG. 4 is an enlarged view illustrating an $R_1$ portion of FIG. 3(a) in which the vertical direction is reversed compared with FIG. 3(a). In FIG. 4, a tilt angle of the insulator 40 with respect to the main surface 10a of the substrate 10 is shown by "θ" as well as an angle between a direction perpendicular to the main surface 10a of the substrate 10 and the insulator 40 is shown by "θ'". That is, a relational expression of θ+θ'=90° is established.

In the embodiment, the tilt angle θ of the insulator 40 is set smaller than the angle θ' between the direction perpendicular to the main surface 10a of the substrate 10 and the insulator 40. Further, the tilt angle θ of the insulator 40 is preferably set within a range of 2 to 20°. When the tilt angle θ of the insulator 40 is set within the range of 2 to 20°, stress can be more eased at the convex curved surface 43 of the insulator 40. Further, when the tilt angle θ of the insulator 40 is set within the range of 2 to 20°, the second connection electrode 32 positioned on the upper surface 40a of the insulator 40 becomes difficult to be visually recognized by the user. This is because a difference between a height position of the second detection electrode 31 and a height position of the second connection electrode 32 becomes small. Accordingly, a visual recognition property of the input device X1 can be improved.

Further, in the embodiment, the upper surface 40a of the insulator 40 is more flat on a cross section in a direction perpendicular to a cross section along the second detection electrode pattern 30 than on the cross section along the second detection electrode pattern 30. Specifically, this means that when a cross section illustrated in FIG. 3(a) is compared with a cross section illustrated in FIG. 3(b), the upper surface 40a of the insulator 40 in the cross section illustrated in FIG. 3(b) is more flat than the upper surface 40a of the insulator 40 in the cross section illustrated in FIG. 3(a). Here, "flat" means that a curvature is small. The "curvature" can be determined by, for example, using a center point in a direction along a cross section as a reference point and calculating a difference between two points consisting of a point of a minimum distance and a point of a maximum distance from the reference point. That is, a smaller difference between the two points means that the curvature is smaller.

Further, in the embodiment, as illustrated in FIG. 2(a), when viewed from above, the insulator 40 is formed in the rectangular shape elongated in a direction along the second detection electrode pattern 30 (in the direction of the arrow B). Specifically, when viewed from above, the insulator 40 is formed in the rectangular shape, a length of which in the direction along the second detection electrode pattern 30 (the direction of the arrow B) is longer than a length of the same in a direction along the first detection electrode pattern 20 (the direction of the arrow A). Accordingly, when the pressure force by the finger or the like of the user is applied to the insulator 40, a relatively large amount of stress is applied in the direction along the second detection electrode pattern 30 of the insulator 40 (the direction of the arrow B), whereas a relatively small amount of stress is applied to the direction along the first detection electrode pattern 20 of the insulator 40 (the direction of the arrow A).

Here, as in the embodiment, when the upper surface 40a of the insulator 40 is more flat on the cross section in the direction perpendicular to the cross section along the second detection electrode patterns 30 than on the cross section along the second detection electrode patterns 30, a relatively large amount of stress applied in the direction along the second detection electrode pattern 30 of the insulator 40 (the direction of the arrow B) can be intensively eased. As a result, stress applied to the second connection electrode 32 at the end portion 42 of the insulator 40 can be more eased.

The detection wiring 50 is a member having a function of applying a voltage to the first detection electrode pattern 20 and the second detection electrode pattern 30. The detection wiring 50 is provided on or above a region of the main surface 10a of the substrate 10 corresponding to the outside region $E_O$. One end of the detection wiring 50 is electrically connected to the first detection electrode pattern 20 and the second detection electrode pattern 30, and the other end of the detection wiring 50 is positioned in the outside conductive region $E_G$. Materials having a conductive property such as ITO, tin oxide, aluminum, aluminum alloy, silver film or silver alloy are examples of a material of the detection wiring 50. Further, an example of a method of forming the detection wiring 50 includes that of the first detection electrode 21.

Figure 5:
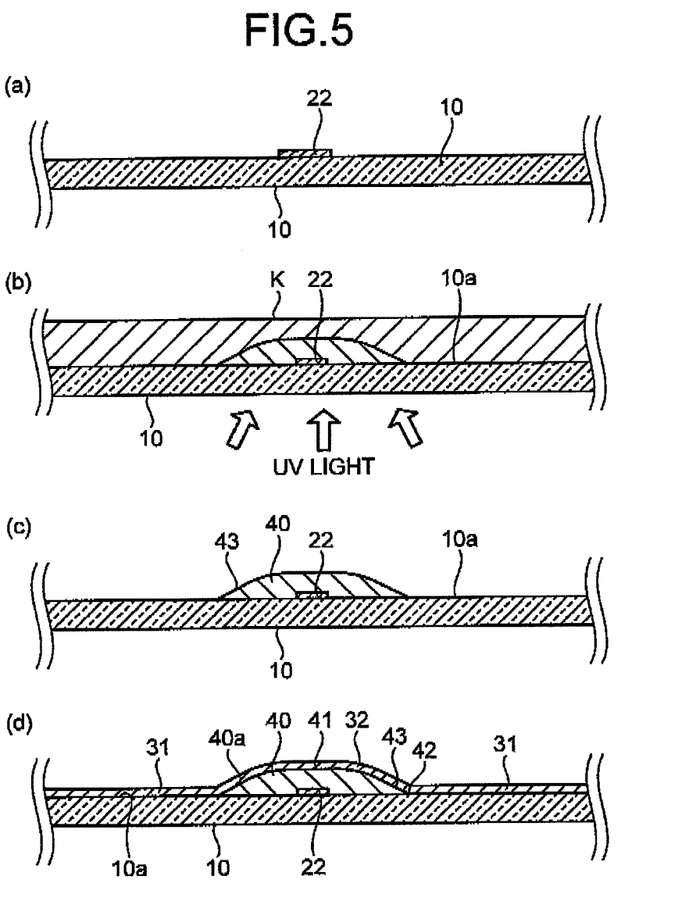
FIGS. 5(a) to 5(d) are views for explaining manufacturing steps of the input device, and are views for explaining manufacturing steps of a cross section taken along the line I-I of FIG. 1.

Next, a manufacturing method of the input device X1 will be explained with reference to FIG. 5. Note that FIGS. 5(a) to 5(d) are cross sectional views along a line I-I of FIG. 1 for explaining manufacturing steps.

First, a material such as ITO is coated on the main surface 10a of the substrate 10 by sputtering, vapor deposition, or chemical vapor deposition (CVD) to form a film. Then, a photosensitive resin is coated on a surface of the formed film and is formed in a desired pattern by executing an exposure process and a development process to the photosensitive resin. Then, etching is executed to the formed film using a chemical solution or the like, and the film is patterned. Then, the first connection electrode 22 is formed as illustrated in FIG. 5(a) by removing the photosensitive resin existing on the surface of the formed film.

Next, a metal mold K having a desired shape is coated with, for example, a UV-curing acrylic resin. Then, as illustrated in FIG. 5(b), the coated metal mold K is pressed to the main surface 10a of the substrate 10 on which the first connection electrode 22 is provided. Then, the acrylic resin is cured by irradiating UV light to the metal mold K from a side of the substrate opposite to the main surface 10a. After the acrylic resin is cured, the insulator 40 is formed as illustrated in FIG. 5(c) by removing the metal mold K.

Next, a film is formed on the main surface 10a of the substrate 10 by further coating a material such as ITO. At this time, when viewed on a cross section, since the insulator 40 has the convex curved surface 43 in the region 20 from the end portion 42 to the apex 41 of the insulator 40, a sufficiently thick film can be formed on the convex curved surface 43. The second detection electrode 31 and the second connection electrode 32 are formed as illustrated in FIG. 5(d) by patterning the formed film into a desired shape. In particular, the second connection electrode 32 is ensured to have a sufficient thickness at the end portion 42 of the insulator 40 by the convex curved surface 43.

As described above, the input device X1 is manufactured.

However, the manufacturing method of the input device X1 is not limited thereto. For example, an insulator 40, which is rectangular when viewed on a cross section, is formed by coating a paste-like resin on the main surface 10a of the substrate 10 and executing an exposure process and a development process. Then, the formed insulator 40 is subjected to a heating treatment for a predetermined time. With this operation, the insulator 40 having a convex curved surface 43 as in the embodiment may be formed by reducing a viscosity of the insulator 40 and smoothing a surface of the insulator 40.

Next, a principle of detection of an input position of the input device X1 will be explained.

In the input region $E_I$, when the finger of the user approaches, comes into contact with, or pushes a surface of the substrate 10 opposite to the main surface 10a, capacitance between the finger, the first detection electrode pattern 20 and the second detection electrode pattern 30 changes. Here, a not illustrated driver provided on the input device X1 detects the changes of the capacitance between the finger, the first detection electrode pattern 20 and the second detection electrode pattern 30 at all times. When the driver detects the change of the capacitance equal to or more than a predetermined value, the driver detects a position at which the change of the capacitance is detected as the input position. In this way, the input device X1 can detect the input position.

Note that any system of a mutual capacitance system and a self-capacitance system may be employed as a system for the input device X1 to detect an input position. When the mutual capacitance system is employed, since plural input positions can be detected at the same time, it is preferable to use the mutual capacitance system in comparison with a case in which the self-capacitance system is employed.

Second Embodiment

Next, an input device X2 according to a second embodiment of the invention will be explained. The input device X2 is a capacitive touch panel, like as the input device X1.

Figure 6:
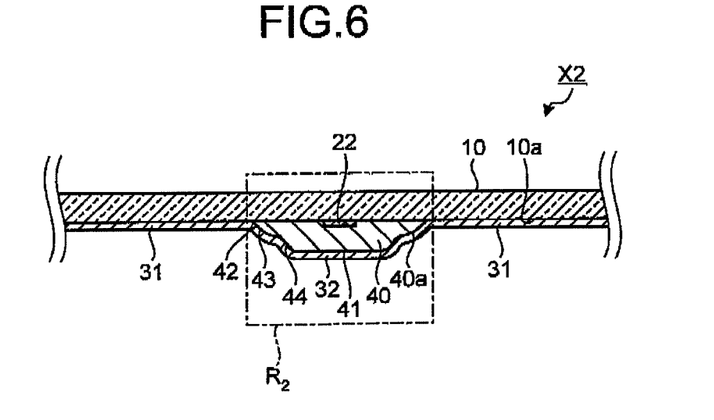
FIG. 6 is a view representing an input device according to a second embodiment of the invention, and is a cross sectional view corresponding to the line I-I of FIG. 1.
Figure 7:
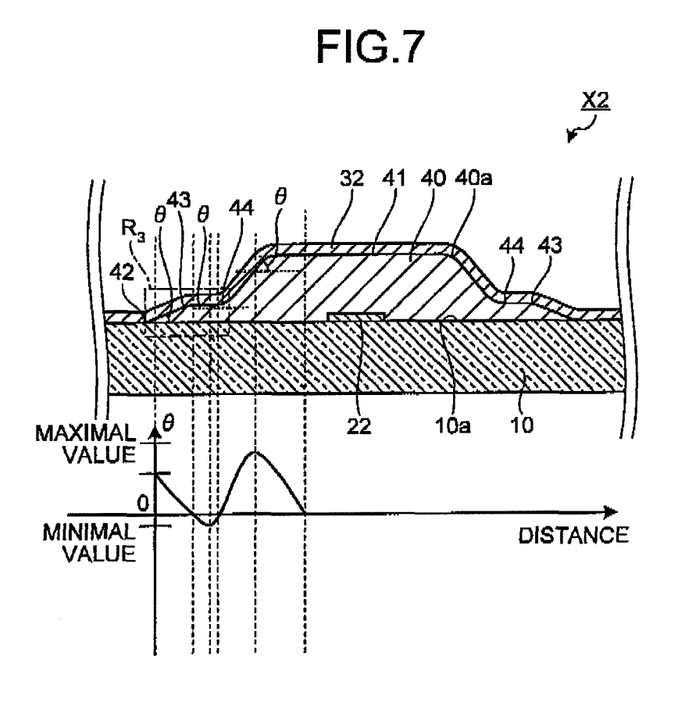
FIG. 7 is an enlarged view representing an $R_2$ section of FIG. 6, and is a view for explaining a change in a tilt angle θ of an insulator with respect to a main surface of a substrate.

FIG. 6 is a view illustrating the input device X2 and is a sectional view corresponding to the line I-I of FIG. 1. FIG. 7 is an enlarged view illustrating an $R_2$ portion of FIG. 6 and is a view explaining a change of a tilt angle θ of an insulator 40 with respect to the main surface 10a of the substrate 10. The tilt angles θ in respective portions of the insulator 40 in FIG. 7 are angles between tangential lines at the respective portions and the main surface 10a of the substrate 10.

In the input device X2, as illustrated in FIG. 7, the tilt angle θ of the insulator 40 with respect to the main surface 10a of the substrate 10 has a local minimal value and a local, maximal value between an apex 41 and an end portion 42 of the insulator 40 on a cross section along the second detection electrode pattern 30. The local minimal value is a value of the tilt angle θ when the tilt angle θ changes from a decrease to an increase in a graph of the tilt angle θ. Further, the local maximal value is a value of the tilt angle θ when the tilt angle θ changes from the increase to the decrease in the graph of the tilt angle θ.

That is, in the input device X2, the insulator 40 has a concave curved surface 44 between the end portion 42 and the apex 41 of the insulator 40. In the embodiment, the concave curved surface 44 is positioned between a convex curved surface 43 and the apex 41. In the embodiment, the convex curved surface 43 and the concave curved surface 44 are smoothly connected. Since the input device X2 has the concave curved surface 44 in addition to the convex curved surface 43, even if a pressure force by a finger or the like of a user is applied to the insulator 40, since stress is eased by the convex curved surface 43 and the concave curved surface 44 of the insulator 40, stress applied to the second connection electrode 32 at the end portion 42 of the insulator 40 can be more eased. Note that the number of concave curved surfaces 44 in one insulator 40 is not particularly limited.

Third Embodiment

Next, an input device X3 according to a third embodiment of the invention will be explained. The input device X3 is a capacitive touch panel, like as the input devices X1, X2.

Figure 8:
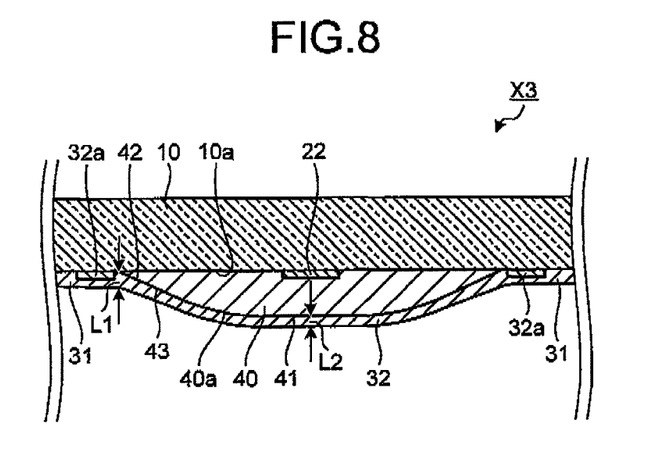
FIG. 8 is a view representing an input device according to a third embodiment of the invention, and is a cross sectional view corresponding to the line I-I of FIG. 1.
Figure 9:
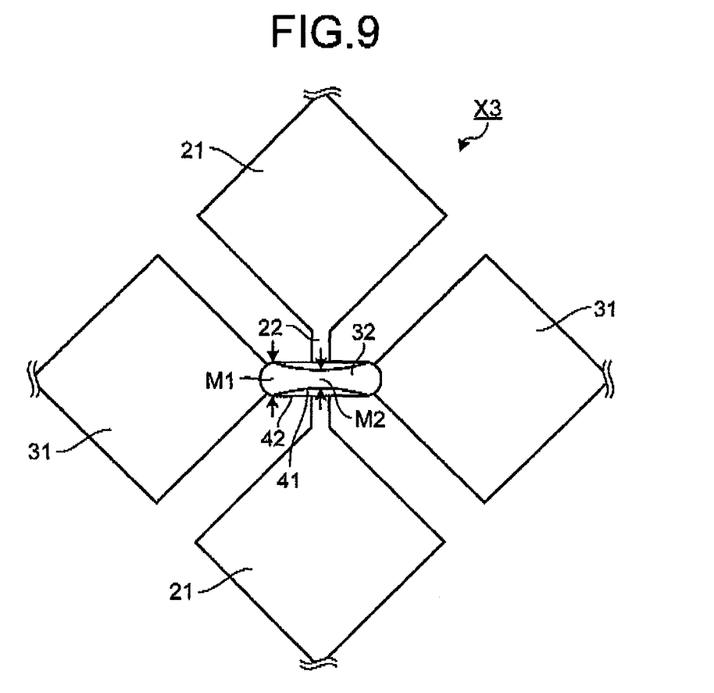
FIG. 9 is an enlarged plan view illustrating a main portion of the input device of FIG. 8.

FIG. 8 is a view illustrating the input device X3 and is a sectional view corresponding to the line I-I of FIG. 1. FIG. 9 is an enlarged plan view illustrating a main portion of the input device X3 of FIG. 8.

In the input device X3, as illustrated in FIG. 8, in a cross section along the second detection electrode pattern 30, a thickness L1 of the second connection electrode 32 of the second detection electrode pattern 30 at the end portion 42 of the insulator 40 is larger than a thickness L2 of the second connection electrode 32 of the second detection electrode pattern 30 at an apex 41 of the insulator 40. Accordingly, even if stress is applied to the second connection electrode 32 at the end portion 42 of the insulator 40 by a pressure force by a finger or the like of a user, since the thickness L1 of the second connection electrode 32 is secured to some extent at the end portion 42 of the insulator 40, durability of the second connection electrode 32 at that portion is improved. Accordingly, in the input device X3, breakage of the second connection electrode 32 can be more reduced.

Note that, in the input device X3, a dummy electrode 32a is provided on a main surface 10a of a substrate 10 in the vicinity of the end portion 42 of the insulator 40. The thickness L1 of the second connection electrode 32 at the end portion 42 of the insulator 40 is increased by disposing the dummy electrode 32a. Note that a method of increasing the thickness L1 is not limited to this method as long as the thickness L1 of the second connection electrode 32 at the end portion 42 of the insulator 40 can be increased.

Further, in the input device X3, as illustrated in FIG. 9, when viewed from above, a width M1 of the second connection electrode 32 of the second detection electrode pattern 30 at the end portion 42 of the insulator 40 is larger than a width M2 of the second connection electrode 32 of the second detection electrode pattern 30 at the apex 41 of the insulator 40. Accordingly, even if stress is applied to the second connection electrode 32 at the end portion 42 of the insulator 40 by a pressure force of a finger or the like of a user, since the width M1 of the second connection electrode 32 is secured to some extent at the end portion 42 of the insulator 40, durability of the second connection electrode 32 at that portion can be improved. Accordingly, in the input device X3, breakage of the second connection electrode 32 can be more reduced.

Note that, in the input device X3, although the case that the thickness L1 of the second connection electrode 32 at the end portion 42 of the insulator 40 is larger than the thickness L2 of the second connection electrode 32 at the apex 41 of the insulator 40 as well as the width M1 of the second connection electrode 32 at the end portion 42 of the insulator 40 is larger than the width M2 of the second connection electrode 32 at the apex 41 of the insulator 40 is explained, the invention is not limited thereto. That is, in the input device X3, it is also possible that the widths M1 and M2 are the same width and the thickness L1 is larger than the thickness L2. Further, in the input device X3, it is also possible that the thicknesses L1 and L2 are the same thickness and the width M1 is larger than the width M2.

Fourth Embodiment

Next, an input device X4 according to a fourth embodiment of the invention will be explained. The input device X4 is a capacitive touch panel, like as the input devices X1 to X3.

Figure 10:
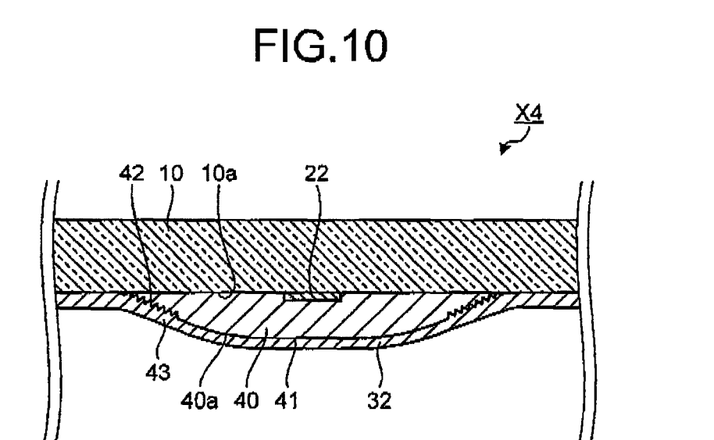
FIG. 10 is a view representing an input device according to a fourth embodiment of the invention, and is a cross sectional view corresponding to the line I-I of FIG. 1.

FIG. 10 is a view illustrating the input device X4 and is a sectional view corresponding to the line I-I of FIG. 1.

In the input device X4, as illustrated in FIG. 10, a surface roughness of an end portion 42 of an insulator 40 is larger than a surface roughness of an apex 41 of the insulator 40. Since the surface roughness of the end portion 42 of the insulator 40 is larger than the surface roughness of the apex 41 of the insulator 40, a contact area between a second connection electrode 32 and the insulator 40 becomes larger at the end portion 42 of the insulator 40 than at the apex 41 of the insulator 40. That is, a bonding strength of the second connection electrode 32 is stronger at the end portion 42 of the insulator 40 than at the apex 41 of the insulator 40. Accordingly, even if stress is applied to the second connection electrode 32 at the end portion 42 of the insulator 40 by a pressure force of a finger or the like of a user, since the bonding strength of the second connection electrode 32 is secured to some extent at the end portion 42 of the insulator 40, the second connection electrode 32 is suppressed from being exfoliated at this portion.

Fifth Embodiment

Next, an input device X5 according to a fifth embodiment of the invention will be explained. The input device X5 is a capacitive touch panel, like as the input devices X1 to X4.

Figure 11:
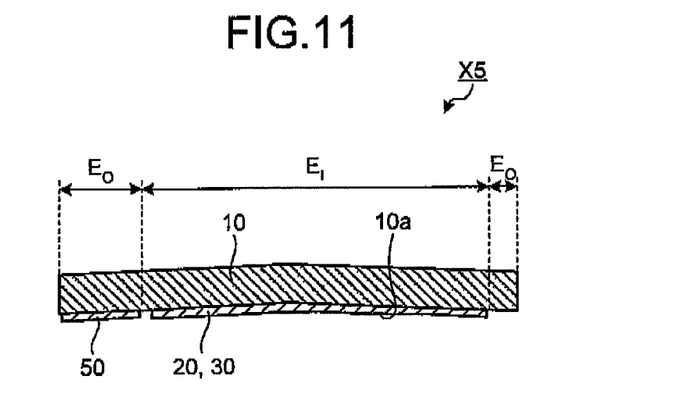
FIG. 11 is a cross sectional view representing an input device according to a fifth embodiment of the invention.

FIG. 11 is a sectional view illustrating the input device X5 according to the fifth embodiment.

In the input device X5, as illustrated in FIG. 11, a substrate 10 is warped so as to project toward opposite to a side on which the first detection electrode pattern 20 and the second detection electrode pattern 30 are provided. In the embodiment, the substrate 10 is configured such that a central portion of an input region $E_I$ is curved so as to project toward opposite to a side on which the first detection electrode pattern 20 and the second detection electrode pattern 30 are provided (that is, toward a side on which a user executes an operation with a finger ox the like). Accordingly, even if stress is applied to the substrate 10 by a pressure force of the finger or the like of the user, since the substrate 10 is curved so as to project toward the side on which the user executes the operation with the finger or the like, stress applied to the first detection electrode pattern 20 and the second detection electrode pattern 30 can be eased.

Next, a display device Y1 having the input device X1 according to the first embodiment will be explained.

Figure 12:
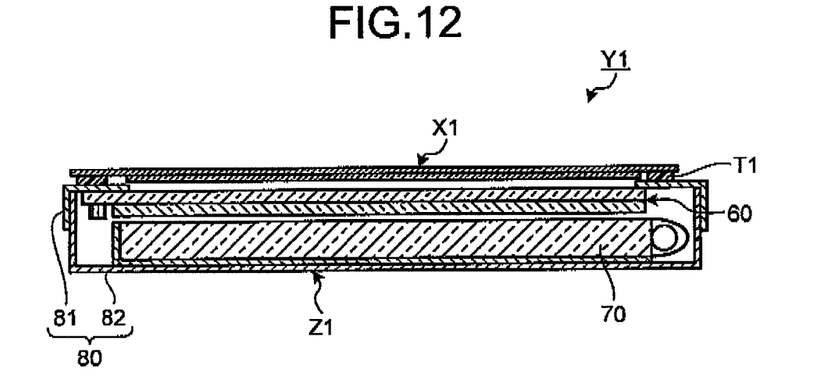
FIG. 12 is a cross sectional view representing a display device having the input device according to the first embodiment.

As illustrated in FIG. 12, the display device X1 has the input device X1 and a liquid crystal display device Z1. Further, the liquid crystal display device Z1 has a liquid crystal display panel 60, a light source device 70, and a housing 80.

Figure 13:
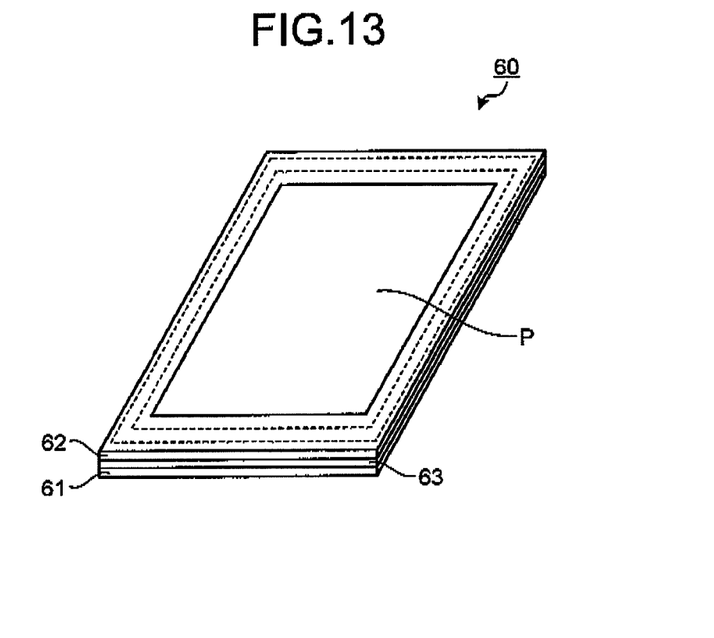
FIG. 13 is a perspective view illustrating a liquid crystal display panel.

As illustrated in FIG. 13, the liquid crystal display panel 60 has an upper substrate 61, a lower substrate 62, and a seal member 63, and a liquid crystal layer (not illustrated) is interposed between the upper substrate 61 and the lower substrate 62. The liquid crystal display panel 60 is formed with a display region P composed of plural pixels for displaying an image by sealing the liquid crystal layer by the seal member 63.

The light source device 70 serves to radiate light to the liquid crystal display panel 60 and is interposed between the liquid crystal display panel 60 and a lower housing 82.

The housing 80 is a member configured to accommodate the liquid crystal display panel 60 and the light source device 70 and has an upper housing 81 and the lower housing 82. As a material of the housing 80, for example, resins such as a polycarbonate resin, metals such as stainless steel, aluminum and the like are exemplified.

The input device X1 and the liquid crystal display device Z1 are bonded via a double sided tape T1. Note that a fixing member used to fix the input device X1 and the liquid crystal display device Z1 is not limited to the double sided tape T1 and may be, for example, bonding members such as a thermosetting resin, or an ultraviolet curable re, and a fixing structural member that display device Z1.

The display device Y1 can display an image on the display region P by controlling the liquid crystal layer for each pixel by a liquid crystal drive circuit provided externally and causing light of the light source device 70 to pass through the liquid crystal display panel 60.

The display device Y1 has the input device X1. With this configuration, the display device Y1 achieves an effect similar to an effect achieved by the input device X1

Note that the embodiments described above show specific examples of the embodiments of the invention and can be variously modified within the scope which does not depart from the gist of the invention. Modifications of the embodiments will be shown below.

Figure 14:
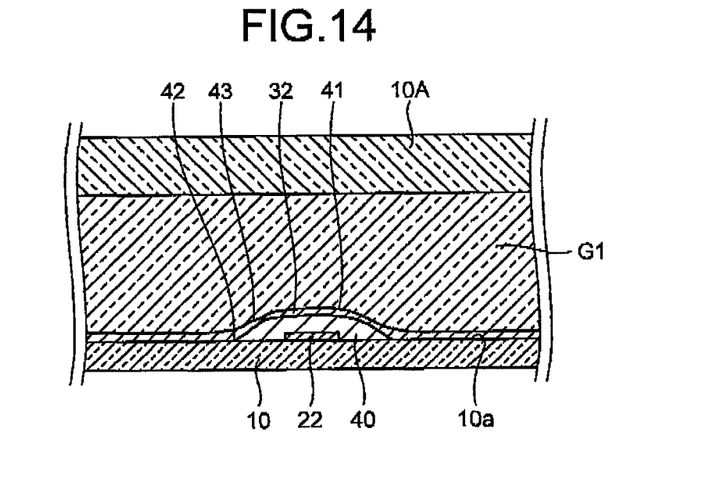
FIG. 14 represents an input device according to a modification of the invention, and, is a view corresponding to the line I-I of FIG. 1.

In the first to fifth embodiments, although the examples that the surface of the substrate 10 opposite to the main surface 10a is the surface operated by the user with the finger or the like, the invention is not limited thereto. For example, as illustrated in FIG. 14, the main surface 10a of the substrate 10 may act as a surface operated by the user with the finger or the like via a protection substrate 10A by bonding the protection substrate 10A on the main surface 10a of the substrate 10 via a joint member G1.

Further, although the example that when viewed from above, the insulator 40 is formed in the rectangular shape elongated in the direction along the second detection electrode pattern 30 is explained, the invention is not limited thereto. That is, the insulator 40 may be formed in a circular shape, an oval shape, or the like when viewed from above. When the insulator 40 is formed in the circular shape, the oval shape when viewed from above, stress applied to the insulator 40 can be more eased.

Figure 15:
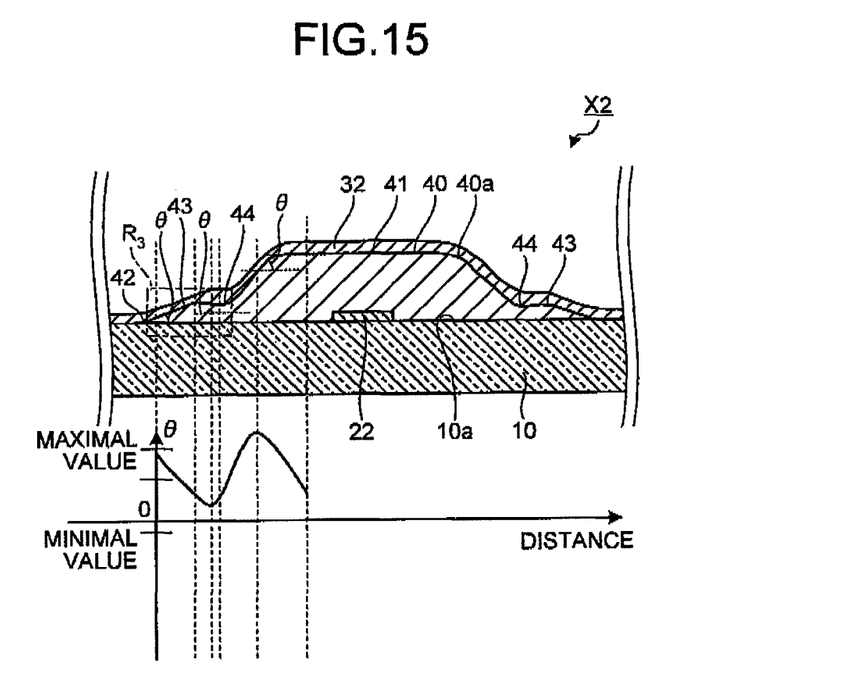
FIG. 15 represents a modification of FIG. 6.

Further, in the input device X2, although the local minimal value of the insulator 40 takes a negative value, it may take a positive value as illustrated in FIG. 15.

Further, in the display device Y1, although the example that the display panel is the liquid crystal display panel is explained, the display panel is not limited thereto. That is, the display panel may be a CRT, a plasma display, an organic EL display, an inorganic EL display, an LED display, a fluorescent display tube, a field emission display, a surface field display, an electronic paper, or the like.

Further, although the example of the display device Y1 having the input device X1 is explained, any of the input devices X2 to X5 may be employed in place of the input device X1.

Further, a novel input device may be employed by combining at least two of the input devices X1 to X5. For example, a novel input device may be employed by combining the input device X1 and the input device X2 or a novel input device may be employed by combining the input devices X1 to X3. Further, for example, a novel input device may be employed by combining the input devices X1 to X4, and a novel input device may be employed by combining the input devices X1 to X5.

REFERENCE SIGNS LIST

X1 to X5 INPUT DEVICE
Y1 DISPLAY DEVICE
Z1 LIQUID CRYSTAL DISPLAY DEVICE
10 SUBSTRATE
20 FIRST DETECTION ELECTRODE PATTERN
21 FIRST DETECTION ELECTRODE
22 FIRST CONNECTION ELECTRODE
30 SECOND DETECTION ELECTRODE PATTERN
31 SECOND DETECTION ELECTRODE
32 SECOND CONNECTION ELECTRODE
40 INSULATOR
41 APEX OF INSULATOR
42 END PORTION OF INSULATOR
43 CONVEX CURVED SURFACE
60 DISPLAY PANEL (LIQUID CRYSTAL DISPLAY PANEL)

The invention claimed is:

1. An input device comprising:
a substrate having a main surface;
a first detection electrode pattern provided on or above the main surface of the substrate; and
a second detection electrode pattern provided on or above the main surface of the substrate, a portion of the second detection electrode pattern intersecting the first detection electrode pattern via an insulator, wherein
the first detection electrode pattern includes a plurality of first detection electrodes and a first connection electrode electrically connecting adjacent first detection electrodes of the plurality of first detection electrodes,
the second detection electrode pattern includes a plurality of second detection electrodes and a second connection electrode electrically connecting adjacent second detection electrodes of the plurality of second detection electrodes, the first connection electrode intersects the second connection electrode via the insulator, the adjacent first detection electrodes are connected to both end portions of the first connection electrode, the end portions of the first connection electrode are exposed from the insulator, the insulator has a convex curved surface on a cross section along the second detection electrode pattern and in a region from an end portion to an apex of the insulator, and a tilt angle is formed between the substrate and the convex curved surface of the end portion of the insulator and is set within a range of 2 to 20 degrees.

2. The input device according to claim 1, wherein an upper surface of the insulator on a cross section perpendicular to the cross section along the second detection electrode pattern is more flat than the upper surface of the insulator on the cross section along the second detection electrode pattern.

3. The input device according to claim 1, the insulator is formed in a rectangular shape elongated in a direction along the second detection electrode pattern as viewed from above.

4. A display device comprising: the input device according to claim 1; and a display panel arranged to face the input device.

5. The display device according to claim 4, wherein the display panel is a liquid crystal display panel.

6. The input device according to claim 1, wherein the adjacent first detection electrodes are provided to cover the both end portions of the first connection electrode.

7. The input device according to claim 1, wherein a surface opposite to the main surface of the substrate is located close to an input operation side compared to the main surface of the substrate.

* * * * *